Nov. 18, 1969          L. D. RHOADS                    3,478,500
                   REEL TYPE RAKE OR SWEEPER
Filed July 20, 1967                           2 Sheets-Sheet 1

INVENTOR.
*LOY D. RHOADS*

Nov. 18, 1969  L. D. RHOADS  3,478,500
REEL TYPE RAKE OR SWEEPER
Filed July 20, 1967  2 Sheets-Sheet 2
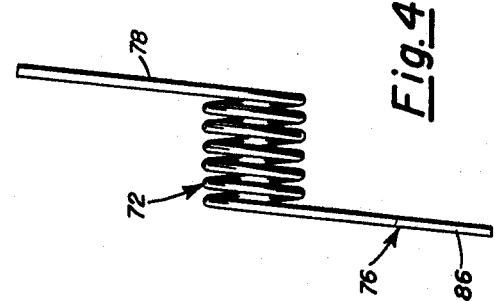
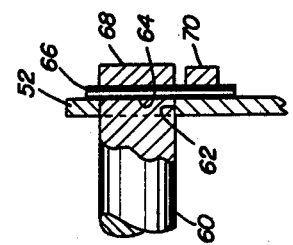
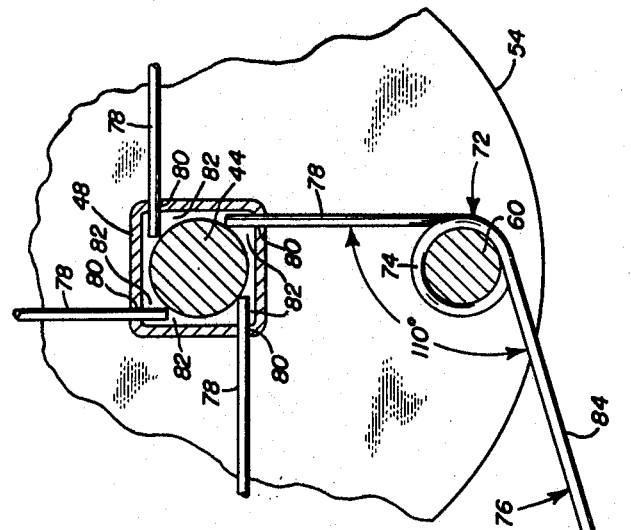
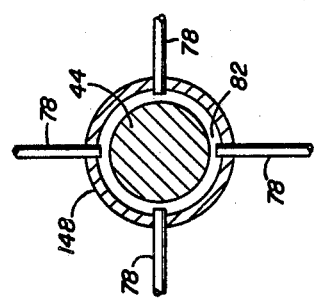
INVENTOR.
LOY D. RHOADS

United States Patent Office 3,478,500
Patented Nov. 18, 1969

3,478,500
REEL TYPE RAKE OR SWEEPER
Loy D. Rhoads, Enon, Ohio, assignor to Parker Sweeper Company, Springfield, Ohio, a corporation of Ohio
Filed July 20, 1967, Ser. No. 654,806
Int. Cl. A01d 57/12, 79/02, 7/06
U.S. Cl. 56—27
11 Claims

ABSTRACT OF THE DISCLOSURE

A reel of the rake type comprises a frame including a plurality of tine supports arranged longitudinally of and spaced an equal distance from one another and an equal distance from the shaft of the frame. The reel also includes tines having coil portions surrounding the tine supports, one end which engages the turf and an opposite end which extends into openings, in the form of holes, in the shaft.

---

The rotatable reel frame includes a plurality of tine supporting rods which are encompassed by the coils of the tines, the inside diameter of the coils being larger than the diameter of the rod. A section of the turf engaging portion of the tine extends directly trailwise from the rod at an obtuse angle relative to that portion of a straight line which interconnects the axes of the coil portion and the shaft, and the outer section or end of the turf engaging portion extends substantially radially of the axis of the shaft means. The turning movement of the entire tine about the rod is limited by anchoring the end of the tine, opposite the turf engaging portion, by walls of an opening in the shaft.

In the preferred embodiment, two concentric shafts are employed, which shafts are referred to herein as "shaft means." One shaft has a sheave affixed thereto and the other shaft extends longitudinally through the drive shaft, is suitably affixed thereto and rotates the tine supporting rods. Plates are fastened to the outer shaft, which plates carry the tine supporting rods. The outer shaft contains the holes which receive the inner ends of the tines and at least portions of the outer shaft are spaced outwardly of the inner shaft to provide receiving spaces for the inner ends of the tines.

The reel of the present invention is designed for use in a machine like that shown in FIGS. 7 to 11 in the Letters Patent to Oblinger, No. 3,308,612, issued Mar. 14, 1967.

Other features and the advantages of the present invention will be apparent from the following description, reference being had to the accompanying drawings wherein preferred embodiments of the invention are illustrated.

IN THE DRAWINGS

FIG. 3 is a fragmentary sectional view taken along line 3—3 of FIG. 2, but on a larger scale, i.e., full scale;

FIG. 4 is a view of one of the springs shown in full size;

FIG. 5 is a fragmentary sectional view, on a larger scale, of a rod and a rod supporting plate; and FIG. 6 is a fragmentary view of another form of the shaft for anchoring the tines.

Figure 1:
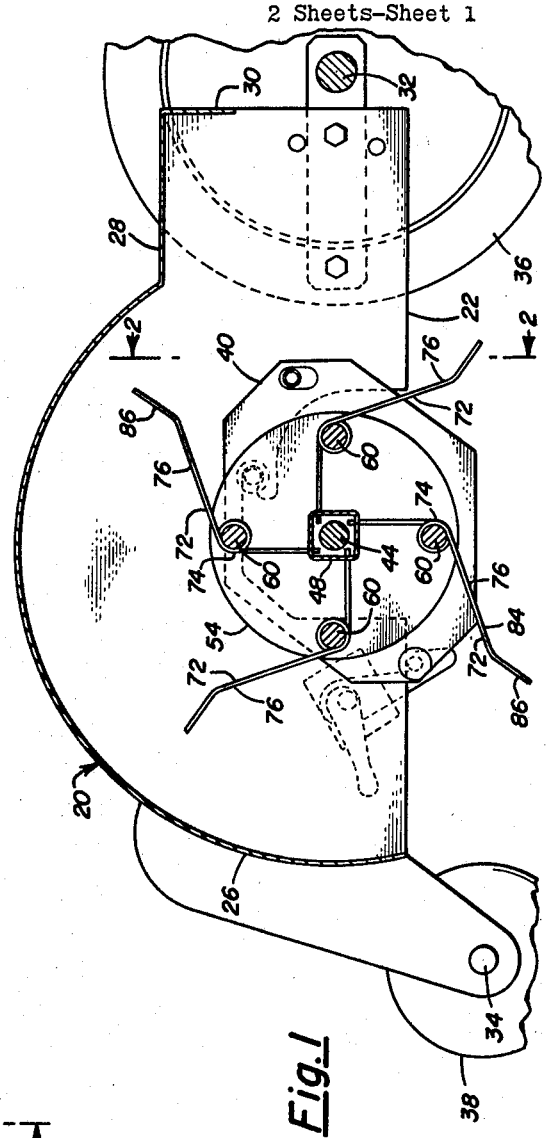
FIG. 1 is a longitudinal view of a rake, showing the housing for the rake in cross section and showing the reel in cross section, the section of the reel being taken along line 1—1 of FIG. 2.
Figure 2:
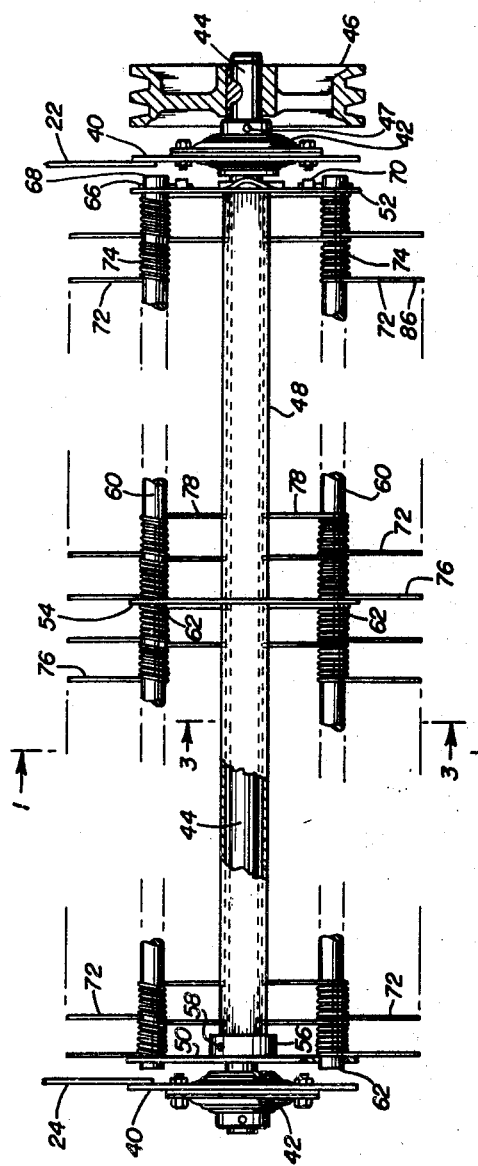
FIG. 2 is a view of the reel looking in the direction of line 2—2 of FIG. 1, part thereof being shown in cross section.

Referring more in detail to the drawings, the open bottom housing 20 includes a right side plate 22, a left side plate 24, an arcuately shaped wall 26 forming the front and the major part of the top of the housing; the top of the housing includes also a flat section 28; the rear of the housing includes a wall 30 which extends downwardly from the rear of the flat top section 28.

The housing is carried by rear axles 32 and a front axle 34; the rear axles are carried by wheels 36 and the front axle is carried by a roller 38.

Bearing plates 40 are attached to the side plates 22 and 24 in any suitable manner. These bearing plates support bearing housings 42 containing bearing races and ball bearings like those disclosed at 246 in the aforementioned Letters Patent No. 3,308,612.

A shaft 44 is journaled in the bearings in housings 42 and the shaft has a sheave 46 keyed thereto for rotating the same. The inner race of the bearing is fixed to the shaft by a set screw 47. A shaft 48 surrounds shaft 44 and the opposite ends thereof carry rod supporting plates 50 and 52, and the center thereof carries a plate 54. Plate 50 has a collar 56 attached thereto, which collar is attached to the drive shaft 44 by a pin 58, whereby rotation of the shaft 44 imparts rotary motion to shaft 48 and plates 50, 52 and 54.

The plates 50, 52 and 54 carry a plurality of tine supporting rods 60, preferably four. These rods extend through holes 62 in the plates and are provided with holes 64 for receiving pins 66. The pins 66 extend through the extension 68 of rod 60 and through openings formed by outwardly and laterally bulging portions 70 in plate 52. The rods 60 are equally spaced from one another, alongside and longitudinally of the axis of shaft 44, and equally spaced from the axis of the shaft 44. Preferably, the rods are arranged parallelly of the axis of shaft 44.

Each rod carries a plurality of tines 72. Each of the tines includes a coil portion 74, a turf engaging portion 76, and an anchoring portion 78. Each anchoring portion 78 extends into an opening in the center of shaft 48. Preferably, the opening is in the form of an individual hole 80 for each portion 78. At least part of the shaft 48 is spaced from shaft 44 to provide a space for receiving the tine anchoring portion 78. Preferably, the shaft 48 is square in cross section, as more clearly shown in FIG. 3, to provide four spaces 82 for each set of anchoring portions 78. However, the surrounding shaft may take various shapes, as for example, it may be round in cross section as shown at 148 in FIG. 6.

The turf engaging portion 76 of the tine 72 includes a section 84 which extends at an obtuse angle with respect to a line which interconnects the axis of the shaft 44 and the axis of the coil portion 74 of the tine. This angle is preferably, approximately, one hundred and ten degrees. The turf engaging portion 76 also includes an end section 86 which lies approximately radially of the axis of shaft 44 and preferably at approximately thirty-five degrees with respect to the section 84.

The tine is formed preferably of flexible and resilient spring steel, number 13 gauge wire (.0915 inch). Each coil includes slightly more than six turns at a pitch of .115. Thirteen tines are disposed on each rod 60 between plates 50 and 54, and twelve tines are disposed on each rod 60 between plates 54 and 52.

It is desirable to dispose the outer section 86 of turf engaging portion 76 substantially radially of the axis of the shaft 44 so that it is highly effective for lifting loose thatch and debris embedded in the turf without removing an appreciable amount of live grass. It has been found, however, in actual practice that when the entire turf portion 76 is disposed in the neighborhood of being radial with respect to the axis of shaft 44, thatch and debris would move inwardly instead of the desired outward movement toward the housing, resulting in clogging of the interior of the reel and poor efficiency. Therefore, the tines are shaped as shown whereby the end sections direct the thatch and debris outwardly while the trailing section 84 inhibits inward movement of the thatch and debris.

The inside diameter of the coil portion 74 is five-eighths of an inch when in static condition while the diameter of the rod 60 is nine-sixteenths of an inch to allow for diameter contraction of the coil when a load is applied thereto as reel turns in a counterclockwise direction as viewed in FIG. 1. Since the reel turns counterclockwise, as viewed in FIG. 1, the tine end section 86, upon engaging the turf, powers the machine forwardly across the ground. Therefore, motor or manual power need not be applied to the machine for moving the same during treating of the turf.

It is has been found, in actual practice, that by providing a relatively long anchoring portion 78 (approximately one and one-half inches), i.e., between the coil portion 74 and the shaft 48, materially less breakage occurs than that experienced when the tine was anchored, as shown in the aforementioned Letters Patent No. 3,308,612, or the structures shown in the patents to Lincoln, No. Re. 12,194; Johnson, No. 282,119; White, No. 954,903; Tucker, No. 2,642,710; Walker, No. 2,707,859; Haupt et al., No. 2,714,796; Warner, No. 2,722,795; and Warnke, No. 3,024,587.

Should one of the tines break, it can be readily replaced. The tine supporting rod is held in place by the pin 66, which pin when removed permits sliding of the rod longitudinally and away from a rod supporting plate, such as 50 or 52.

From the foregoing, it is readily apparent that breakage of tines has been materially reduced. Furthermore, relatively few parts are needed to form the reel, and these parts can be assembled and disassembled readily. Too, the cost of manufacture of this simple reel has been materially reduced.

While the forms of embodiment herein shown and described, constitute preferred forms, it is to be understood that other forms may be adopted falling within the scope of the claims that follow.

I claim:
1. A reel of the rake type, comprising in combination:
   (A) a rotatable reel frame including:
      (1) shaft means having a plurality of openings arranged longitudinally of and alongside the axis of the shaft means, said openings being equally spaced from one another and equally spaced from said axis;
      (2) a plurality of tine supporting rods, said rods being arranged longitudinally of and alongside the axis and outwardly of the shaft means and equally spaced from one another and equally spaced from said axis;
   (B) a plurality of resilient tines, each having:
      (1) a coil portion surrounding a rod, the inside diameter of the coil being larger than the outside diameter of a rod;
      (2) a turf engaging portion extending outwardly from one end of the coil portion;
      (3) and a portion extending from the opposite end of the coil portion and extending into one of the openings in the shaft means.
2. A reel as defined in claim 1, characterized in that said openings in the shaft means are in the form of holes arranged in rows and that each of the last mentioned portions of the tines, respectively, extends into one of the holes.
3. A reel as defined in claim 1, characterized in that the turf engaging portion (B)(3) of the tines includes:
   (a) a section extending directly from the coil portion trailwise of the rod at an obtuse angle relative to that portion of a straight line which interconnects the axes of the said coil portion and the shaft means;
   (b) and an end section extending substantially radially of the axis of the shaft means.
4. A reel as defined in claim 1, characterized in that the rods are arranged parallelly of the axis of the shaft means.
5. A reel as defined in claim 1, characterized in that the shaft means (A)(1) includes:
   (a) a hollow shaft, said openings being in the shaft.
6. A reel as defined in claim 1, characterized in that the shaft means (A)(1) includes:
   (a) a hollow shaft, said openings being in the shaft;
   (b) a shaft extending longitudinally through the hollow shaft, the portions of the hollow shaft containing said openings being spaced outwardly of the second mentioned shaft to provide receiving spaces for the last mentioned portions (B)(3) of the tines.
7. A reel as defined in claim 1, characterized in that the rotatable frame (A) includes:
   (3) spaced plates fastened to the shaft means, said tine supporting rods being fastened to the plates.
8. A reel as defined in claim 3, characterized in that the said obtuse angle is approximately one hundred and ten degrees.
9. A reel as defined in claim 3, characterized in that said openings in the shaft means are in the form of holes arranged in rows and that each of the last mentioned portions of the tines, respectively, extends into one of the holes.
10. A reel as defined in claim 3, characterized in that the rods are arranged parallelly of the axis of the shaft means.
11. A reel as defined in claim 5, characterized in that the rotatable frame (A) includes:
   (3) spaced plates fastened to the hollow shaft, said rods being affixed to the plates.

References Cited

UNITED STATES PATENTS

| | | | |
|---|---|---|---|
| 1,939,385 | 12/1933 | Burr | 56—400.02 |
| 2,826,034 | 3/1958 | Feuerlein | 56—400.02 |
| 2,987,866 | 6/1961 | Ferris | 56—27 |
| 2,989,833 | 6/1961 | De Fino | 56—27 |
| 3,024,587 | 3/1962 | Warnke | 56—27 |
| 3,125,844 | 3/1964 | Beyer | 56—27 |
| 3,183,653 | 5/1965 | Cromwell | 56—27 |
| 3,308,612 | 3/1967 | Oblinger | 56—27 |

RUSSELL R. KINSEY, Primary Examiner

U.S. Cl. X.R.

56—364, 367, 372, 379, 400, 400.02